United States Patent
Pina Ortega (10) Patent No.: US 9,979,243 B2
(45) Date of Patent: May 22, 2018

(54) LOW COST INJECTION MOLDED BURIED PERMANENT MAGNET MOTOR FOR AN ELECTRIC POWER STEERING SYSTEM

(71) Applicant: STEERING SOLUTIONS IP HOLDING CORPORATION, Saginaw, MI (US)

(72) Inventor: Alejandro J. Pina Ortega, Midland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 371 days.

(21) Appl. No.: 14/940,955

(22) Filed: Nov. 13, 2015

(65) Prior Publication Data

US 2016/0141927 A1 May 19, 2016

Related U.S. Application Data (60) Provisional application No. 62/081,214, filed on Nov. 18, 2014.

(51) Int. Cl.
*H02K 1/27* (2006.01)
*H02K 1/28* (2006.01)
(Continued)

(52) U.S. Cl.
CPC ............... *H02K 1/278* (2013.01); *H02K 1/02* (2013.01); *H02K 1/16* (2013.01); *H02K 1/2773* (2013.01);
(Continued)

(58) Field of Classification Search
CPC ......... H02K 1/278; H02K 1/2773; H02K 1/28
(Continued)

(56) References Cited

U.S. PATENT DOCUMENTS

| 5,962,944 A | 10/1999 | Narita et al. |
| 6,147,428 A * | 11/2000 | Takezawa ............ H02K 1/2766 310/156.57 |

(Continued)

FOREIGN PATENT DOCUMENTS

| CN | 103780038 A | 5/2014 |
| CN | 203911704 U | 10/2014 |

(Continued)

OTHER PUBLICATIONS

Office Action regarding related CN App. No. 201511035941; dated Jul. 25, 2017; 3 pgs.

(Continued)

*Primary Examiner* — Jeremy Luks
(74) *Attorney, Agent, or Firm* — Cantor Colburn LLP (57) ABSTRACT

An interior permanent magnet motor includes a housing, a ring-shaped stator fixed in the housing and having a coil which generates a magnetic field when a voltage is applied, a rotor being disposed for rotation within, and relative to the ring-shaped stator. The rotor includes a shaft rotatably supported by the housing, a magnetic plate pair disposed about an outer circumference of the rotor. A triangular member is disposed between the magnetic plate pair and the shaft. The triangular member having a flat surface mated to each inner end of each magnetic plate of the magnetic plate pair. The triangular member directs flux produced by rotation of the rotor toward the stator.

20 Claims, 6 Drawing Sheets

(51) Int. Cl.
*H02K 5/16* (2006.01)
*H02K 1/16* (2006.01)
*H02K 7/00* (2006.01)
*H02K 1/02* (2006.01)

(52) U.S. Cl.
CPC ............... *H02K 1/28* (2013.01); *H02K 5/161* (2013.01); *H02K 7/003* (2013.01)

(58) Field of Classification Search
USPC ........................................ 310/156.53, 156.56
See application file for complete search history.

(56) References Cited

U.S. PATENT DOCUMENTS

| | | | | |
|---|---|---|---|---|
| 6,794,784 B2* | 9/2004 | Takahashi | ............... | H02K 1/246 310/156.53 |
| 7,151,335 B2* | 12/2006 | Tajima | ................. | H02K 1/2766 310/156.48 |
| 7,612,480 B2* | 11/2009 | Fujii | .................... | H02K 1/2766 310/156.53 |
| 8,319,387 B2* | 11/2012 | Maemura | ............. | H02K 1/2766 310/156.01 |
| 8,461,737 B2* | 6/2013 | Feng | ...................... | H02K 1/223 310/156.53 |
| 8,546,990 B2* | 10/2013 | Suzuki | ................. | H02K 1/2766 310/156.53 |
| 8,598,763 B2* | 12/2013 | Aota | .................... | H02K 1/2766 310/156.53 |
| 9,698,636 B2* | 7/2017 | Matsuoka | ............ | H02K 1/2773 |
| 2001/0017499 A1 | 8/2001 | Kaneko | | |
| 2004/0080228 A1* | 4/2004 | Ahn | ...................... | H02K 1/2766 310/156.56 |
| 2005/0104468 A1* | 5/2005 | Araki | ................... | H02K 1/2766 310/156.53 |
| 2007/0063607 A1* | 3/2007 | Hattori | ................. | H02K 1/2766 310/156.53 |
| 2007/0103024 A1 | 5/2007 | Nakayama | | |
| 2008/0007131 A1* | 1/2008 | Cai | ...................... | H02K 1/2766 310/156.38 |
| 2012/0126637 A1 | 5/2012 | Ankeney et al. | | |
| 2013/0113323 A1* | 5/2013 | Yamada | ................ | H02K 1/2706 310/156.07 |
| 2014/0001910 A1* | 1/2014 | Shibata | .................. | H02K 15/03 310/156.43 |
| 2014/0232232 A1* | 8/2014 | Yamaguchi | .......... | H02K 1/2766 310/156.53 |
| 2014/0306569 A1* | 10/2014 | Kojima | .................... | H02K 1/28 310/156.21 |
| 2015/0001970 A1 | 1/2015 | Zhang et al. | | |
| 2015/0001981 A1* | 1/2015 | Hattori | ................ | H02K 1/2766 310/156.53 |
| 2015/0137629 A1 | 5/2015 | Chowdhury et al. | | |
| 2015/0318745 A1* | 11/2015 | Matsuoka | ............ | H02K 1/2773 310/156.56 |
| 2015/0318746 A1* | 11/2015 | Miyajima | ............ | H02K 1/2773 310/71 |

FOREIGN PATENT DOCUMENTS

| | | |
|---|---|---|
| DE | 4033454 A1 | 4/1992 |
| DE | 102012020927 A1 | 9/2013 |
| EP | 1128522 A1 | 8/2001 |
| EP | 2139093 A2 | 12/2009 |
| EP | 2680403 A2 | 1/2014 |
| JP | 2001251825 A1 | 9/2001 |
| JP | 2004104962 A | 4/2004 |
| JP | 2007336671 A | 12/2007 |
| JP | 2010004671 A | 1/2010 |
| WO | 2007008110 A1 | 1/2007 |
| WO | 201303118 A1 | 7/2013 |

OTHER PUBLICATIONS

Extended European search report for related European application No. 15194970.8, dated Jul. 13, 2016, pp. 8.

Search Report regarding related EP App. No. 14862913.2; dated Apr. 25, 2017; 12 pgs.

\* cited by examiner

LOW COST INJECTION MOLDED BURIED PERMANENT MAGNET MOTOR FOR AN ELECTRIC POWER STEERING SYSTEM

CROSS-REFERENCE TO RELATED APPLICATION

This patent application claims priority to U.S. Provisional Patent Application Ser. No. 62/081,214, filed Nov. 18, 2014, which is incorporated herein by reference in its entirety.

BACKGROUND OF THE INVENTION

The present invention relates generally to permanent magnet motors that include interior permanent magnets in a rotor.

Permanent magnet brushless (PMBLDC or PMSM) motors may exhibit relatively high torque densities and are therefore useful in industrial drives for high performance applications. Permanent magnet (PM) motors with buried magnets are used in variable speed drives.

The placement of magnets inside the magnet pockets of interior permanent magnet (IPM) motors with rectangular bar magnets is an issue due to the manufacturing tolerances of both magnet bars and magnet pockets. This magnet placement creates ripple torque depending on the slot/pole combination of the motor. For high performance applications, torque ripple is an important challenge for PM motors as it creates vibration and speed pulsation. Moreover, cogging torque minimization in IPM motors is more challenging compared to surface permanent magnet (SPM) motors. IPM motors allow for smaller air gaps and linear skewing. Shaping of the magnet presents design difficulties due to the rectangular shape of the permanent magnets.

Various techniques have been attempted to minimize the cogging torque. Conventional techniques tend to add to the complexity and can negatively impact output torque. In addition, in motors employing sintered magnets, the increased complexity can contribute significantly to cost.

Magnet pole shaping, skewing of rotor magnets or stator structures, step-skewing of rotor magnets, combining slots and poles, magnet shaping, and incorporation of notches in the stator teeth have been employed to minimize cogging torque in PM motors. Unfortunately, however, these conventional techniques cause additional design challenges. For example, the use of segmented stators, while bringing about improvements in slot fill and manufacturing time of the motor, have also given rise to certain undesirable harmonics, such as a large ninth order harmonic attributed to the gaps disposed between stator segments.

Accordingly, it is desirable to have an improved rotor design and techniques for imbedding magnets in rotors of IBPM.

SUMMARY OF THE INVENTION

In one aspect of the invention, an interior permanent magnet motor comprises a housing, a ring-shaped stator fixed in the housing and having a coil which generates a magnetic field when a voltage is applied, a rotor being disposed for rotation within, and relative to the ring-shaped stator, the rotor comprises a shaft rotatably supported by the housing a magnetic plate pair disposed about an outer circumference of the rotor, wherein each magnetic plate of the magnetic plate pair has opposing sides that extend from the outer circumference toward the shaft, the opposing sides are bounded by an inner end of each magnetic plate, and a triangular member disposed between the magnetic plate pair and the shaft, the triangular member having a flat surface mated to each inner end of each magnetic plate of the magnetic plate pair, the triangular member directs flux produced by rotation of the rotor toward the stator.

In another aspect of the invention, an interior permanent magnet rotor comprises a rotor being disposed for rotation within, and relative to the ring-shaped stator, the rotor comprises a shaft rotatably supported by the housing; a magnetic plate pair disposed about an outer circumference of the rotor, wherein each magnetic plate of the magnetic plate pair has opposing sides that extend from the outer circumference toward the shaft, the opposing sides are bounded by an inner end of each magnetic plate; a triangular member disposed between the magnetic plate pair and the shaft, the triangular member having a flat surface mated to each inner end of each magnetic plate of the magnetic plate pair, the triangular member directs flux produced by rotation of the rotor toward the stator.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
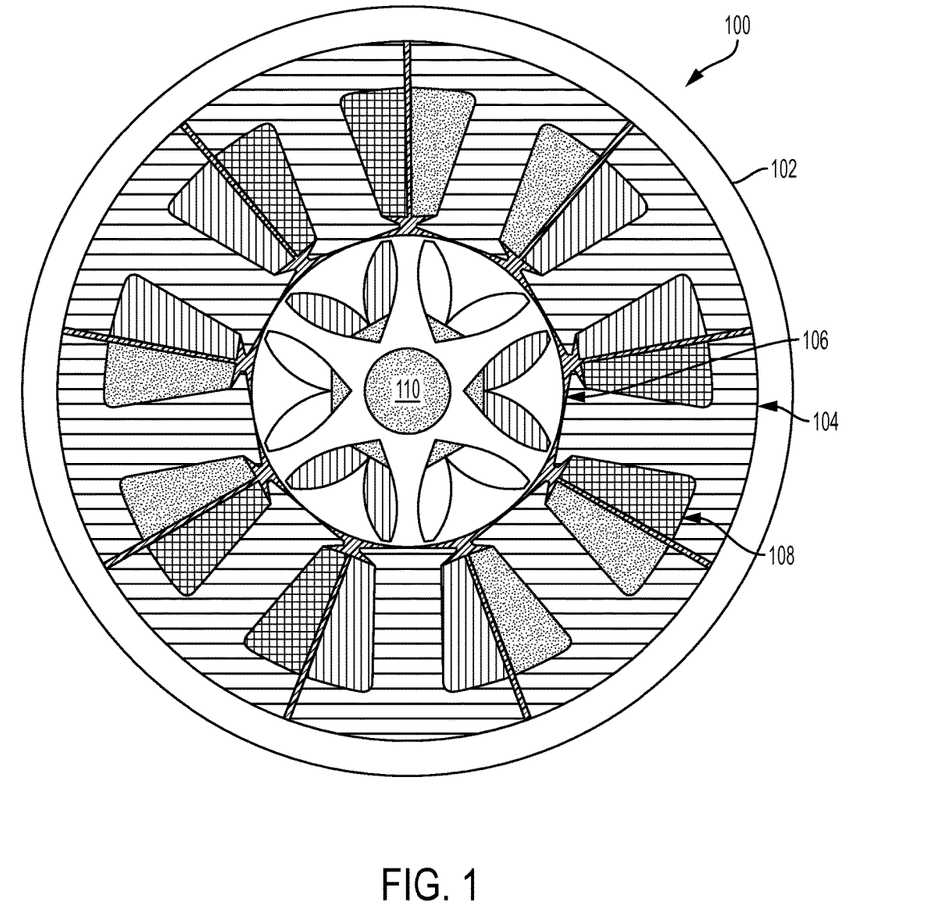
FIG. 1 shows a motor in accordance with the invention.

Referring now to the Figures, where the invention will be described with reference to specific embodiments without limiting the same, FIG. 1 illustrates a cross-sectional view of an IPM motor 100. As shown in FIG. 1, the IPM motor 100 comprises a housing 102, a ring-shaped stator 104 fixed in the housing 102 and a rotor 106. The ring-shaped stator 104 may have a coil suitable for conducting an electrical current. In this embodiment, the coil of the stator 104 is formed by plurality of cores 108. The rotor 106 includes a shaft 110 rotatably attached to the housing 102. The electrical current in the coil of the ring-shaped stator 104 may cause rotation of the shaft 110 relative to the ring-shaped stator 104. The IPM motor 100, including the ring-shaped stator 104 and the rotor 106, may be cylindrically shaped or disk shaped, in some embodiments.

Figure 2:
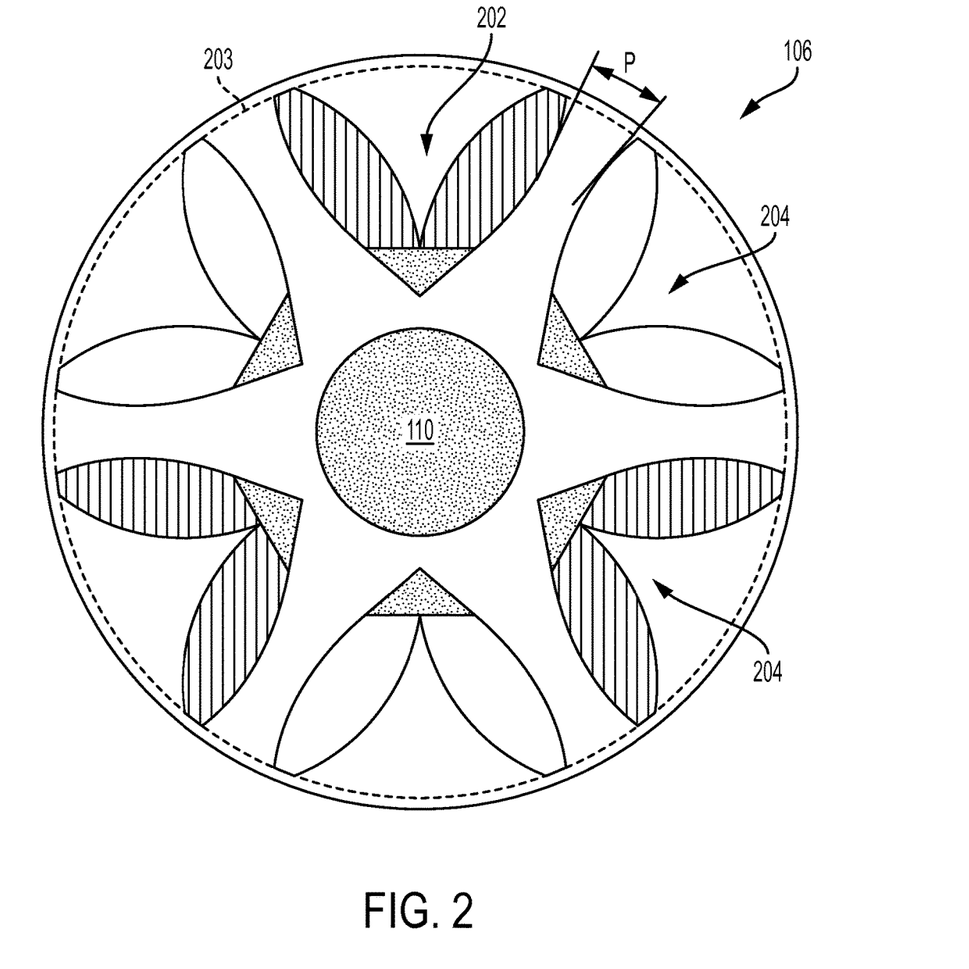
FIG. 2 shows a rotor in accordance with the invention.

FIG. 2 illustrates the rotor 106 in accordance with some embodiments of the invention. In addition to the shaft 110, the rotor 106 comprises at least one magnetic plate pair 202. The magnetic plate pair 202 may be disposed about an outer circumference 203 of the rotor 102. In this embodiment, the outer circumference 203 is spaced inward toward the shaft 110, leaving a space between the outer surface of the rotor 106 and an outer end of a magnetic plate of the magnetic plate pair 202.

In the embodiment shown in FIG. 2, a plurality of magnetic plate pairs 204 are circumferentially spaced about the rotor. Although six magnetic plate pairs are illustrated as the plurality of magnetic plate pairs 204 for purposes of description, any number of magnetic plate pairs may exist in the rotor 106, such as three, four, ten, etc.

Adjacent magnetic plate pairs may alternate in magnetic polarity. For example, a first magnetic plate pair may have a north magnetic polarity, where second magnetic plate pair may have a south magnetic polarity. The alternation of magnetic polarity of the plurality of magnetic plate pairs may continue throughout the rotor. Furthermore, adjacent magnetic plate pairs may be spaced by a pitch defined by a distance P. As shown in FIG. 2, the plurality of magnetic plate pairs 204 are approximately equidistantly spaced about the rotor 106, so the pitch P is approximately equal between magnetic pairs.

In some embodiments, the plurality of magnetic plate pairs 204 are anisotropic injected molded magnets. The rotor 106 can be manufactured by using powder metal, a casting process, or any other suitable metal.

Figure 3:
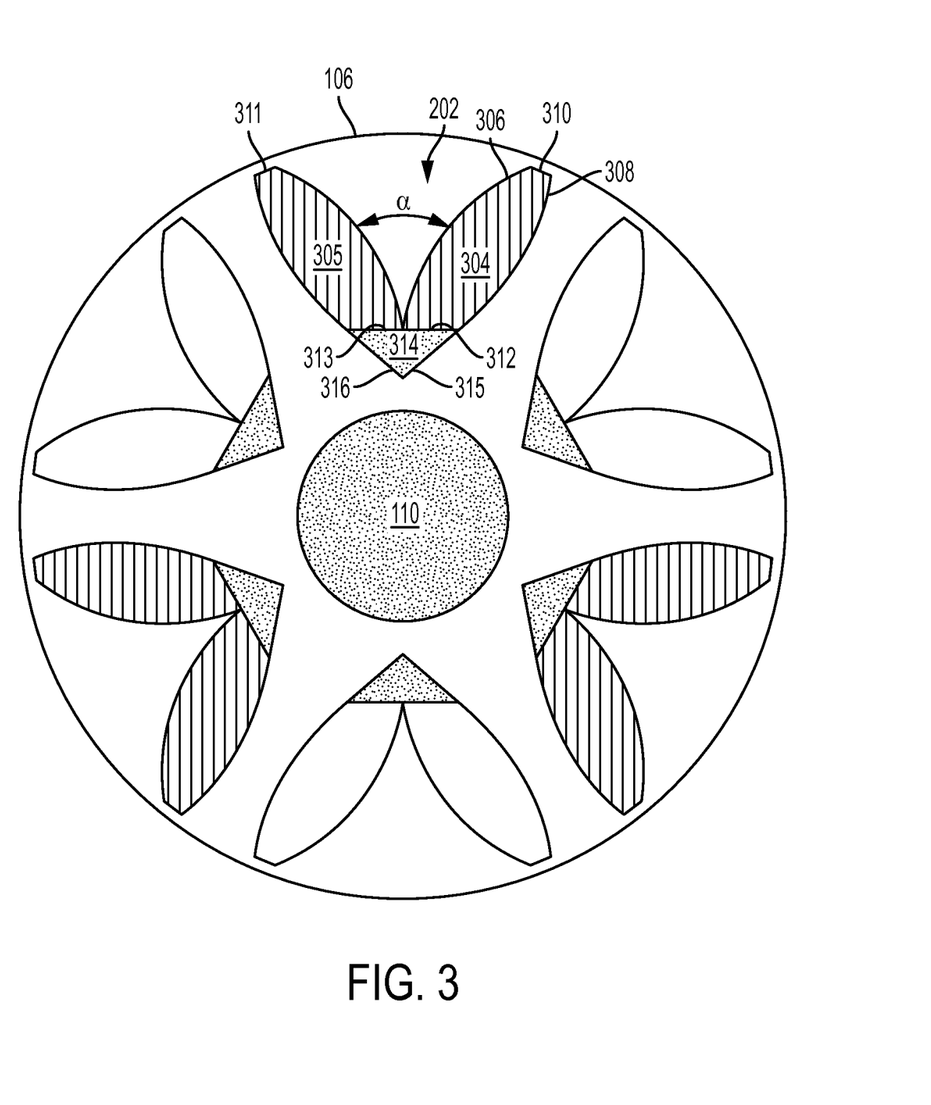
FIG. 3 illustrates a magnetic plate pair of the rotor in accordance with the invention.

FIG. 3 illustrates the magnetic plate pair 202 of the rotor 106 in more detail. The magnetic plate pair 202 has magnetic plates 304, 305. In this embodiment, magnetic plates 304, 305 each have opposing convex sides 306, 308 that extend from the outer circumference toward the shaft 110. The opposing convex sides 306, 308 of magnetic plates 304, 305 are bounded by the outer ends 310, 311 and an inner ends 312, 313 of the respective magnetic plates 304, 305.

In some embodiments, the magnetic plates 304, 305 may be injection-molded, or filled by using an injection molding process. The invention is not limited to an injection molding process. In addition, in some embodiments, the magnetic plates 304, 305 may be compressed magnets. The magnetic plates 304, 305 may represent any magnetic plates of the plurality of magnetic pairs.

In this embodiment, the magnetic plates 304, 305 are oriented to form an angle α between magnetic plates of the magnetic plate pair. The angle α may increase as a radial distance from the shaft 110 increases (e.g. distance from the inner end toward the outer end of the magnetic plate pair).

As shown in FIG. 3, the rotor 106 may further comprise a plurality of triangular members. In this embodiment, a triangular member 314 of the plurality of triangular members is disposed between the magnetic plate pair 202 and the shaft. The triangular member 314 has a flat surface mated to inner ends 312, 313 of the magnetic plates 304, 305 of the magnetic plate pair 202. Accordingly, the flat surface of the triangular member 314 may physically contact each the magnetic plates 304, 305 of the magnetic plate pair 202.

The flat surface of the triangular member 314 may be bounded by a second side and third side of the triangular member. The second side and third side of the triangular member may be adjacent to one another, and extend from the flat surface toward the shaft 110, forming an apex of the triangular member 314. The apex of the triangular member may extend to the shaft, or as shown in FIG. 2, the apex may be spaced from the shaft. The spacing of the apex from the shaft leaves a space formed by inner circumference to the shaft.

The plurality of triangular members may be made of any non-magnetic material including but not limited to plastic, aluminum, and/or glue. Alternatively, the plurality of triangular members may be an air gap formed by the rotor 106 and the inner ends 312, 313 of the magnetic plate pair 202. The composition of triangular members with the rotor 106 may vary within the rotor 106, or be consistent within the rotor 106.

The plurality of triangular members are configured to decrease flux leakage by directing flux away from the shaft 110. Thus, the flux is concentrated radially outward, while softening torque pulsations of the motor.

Figure 4:
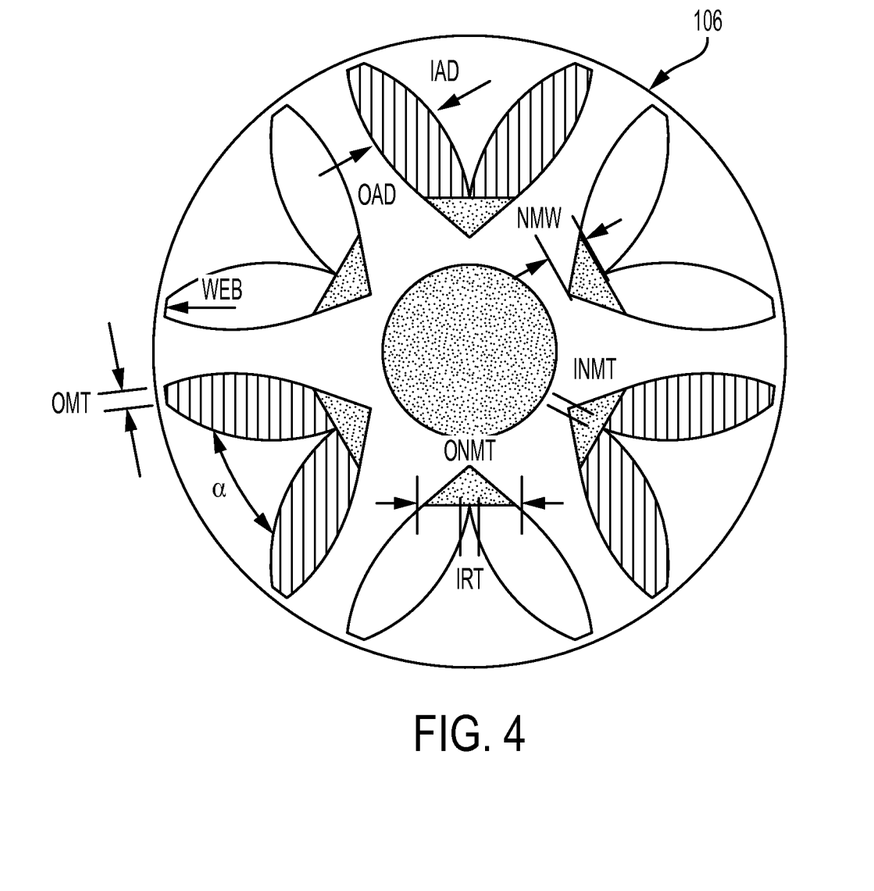
FIG. 4 illustrates specific geometries of the rotor in accordance with the invention.

FIG. 4 illustrates specific geometries of the rotor 106. A magnet inner arc diameter (IAD), magnet outer arc diameter (OAD) are defined. A minimum distance between the magnet and the outer rotor radius is defined by WEB. An outer magnet thickness (OMT), inner rib thickness (IRT), and an angular distance in between two plates of a single magnetic pole is defined by α. These parameters shape the non-magnetic material, reducing cogging and ripple torque, those parameters are also shown below. An outer non-magnetic thickness (ONMT), an inner non-magnetic thickness (INMT) and non-magnetic width (NMW) may define a triangular member that decreases flux leakage, concentrating the flux radially outward while softening torque pulsations of a motor.

Figure 5:
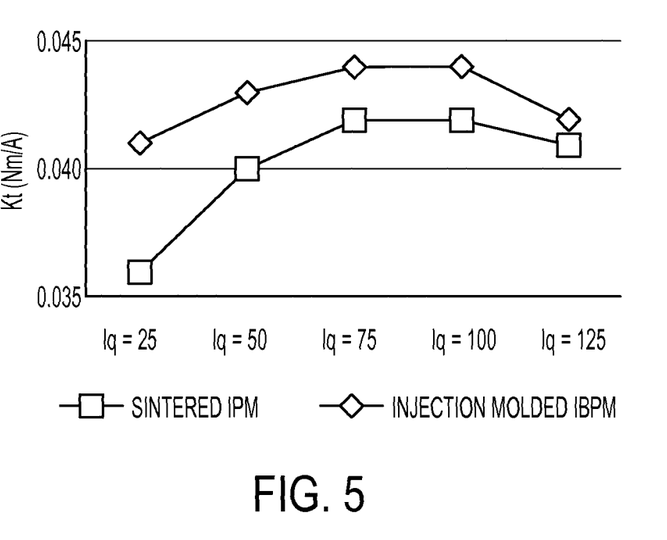
FIG. 5 shows a relationship for torque constant ($K_t$) saturation by comparing results with conventional sintered magnets versus exemplary designs in accordance with the invention.

FIG. 5 shows relationships for torque constant ($K_t$) saturation by comparing results with conventional sintered interior permanent magnets versus exemplary designs in accordance with the invention. In an exemplary embodiment, the injection molded IBPM shows greater $K_t$ relative to sintered interior permanent magnet motors.

Figure 6:
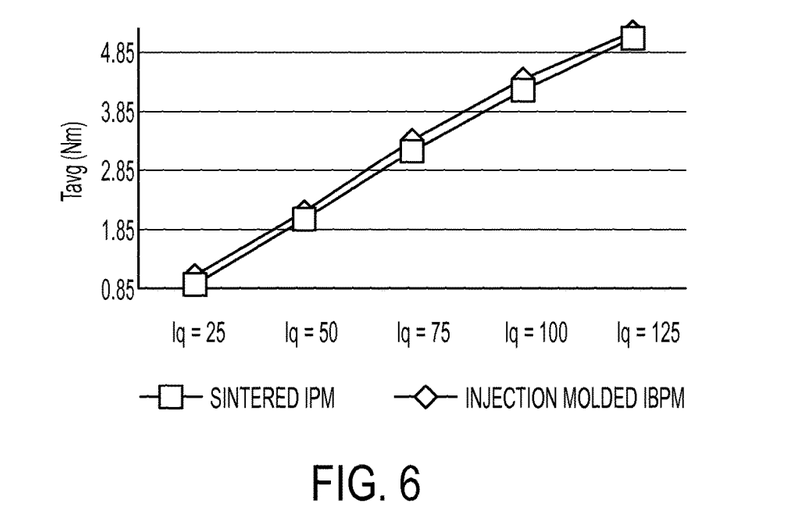
FIG. 6 shows an exemplary relationship for average torque by comparing results with conventional sintered magnets versus exemplary designs in accordance with the invention.

FIG. 6 shows relationships for average torque ($T_{avg}$) by comparing results with conventional sintered interior permanent magnets versus exemplary designs in accordance with some embodiments of the invention. In an exemplary embodiment, the injection molded IBPM shows greater average torque relative to sintered interior permanent magnet motors.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An interior permanent magnet motor comprising:
   a housing;
   a ring-shaped stator fixed in the housing and having a coil which generates a magnetic field when a voltage is applied;
   a rotor being disposed for rotation within, and relative to the ring-shaped stator, the rotor comprises:
      a shaft rotatably supported by the housing;
      a magnetic plate pair disposed about an outer circumference of the rotor, each magnetic plate of the magnetic plate pair having opposing sides that extend from the outer circumference toward the shaft, the opposing sides are bounded by an inner end of each magnetic plate;
      a triangular member disposed between the magnetic plate pair and the shaft, the triangular member having a flat surface mated to each inner end of each magnetic plate of the magnetic plate pair, the triangular member directs flux produced by rotation of the rotor toward the stator.

2. The interior permanent magnet motor of claim 1, wherein the triangular member comprises adjacent sides that extend toward the shaft.

3. The interior permanent magnet motor of claim 1, wherein at least one side of the opposing sides is convex in shape.

4. The interior permanent magnet motor of claim 1, wherein the triangular member is substantially non-magnetic.

5. The interior permanent magnet motor of claim 4, wherein the triangular member is made of plastic.

6. The interior permanent magnet motor of claim 1, wherein a plurality of magnetic plate pairs and a plurality of triangular members are circumferentially spaced within the rotor about an axis formed by the shaft.

7. The interior permanent magnet motor of claim 1, wherein a second side and a third side of the triangular member form an apex of the triangular member.

8. The interior permanent magnet motor of claim 1, wherein the rotor, the ring-shaped stator and the shaft are cylindrically-shaped.

9. The interior permanent magnet motor of claim 1, wherein the plurality of magnetic plate pairs and the triangular members extend along the cylindrically-shaped rotor.

10. The interior permanent magnet motor of claim 1, wherein the plurality of magnetic plate pairs are injection-molded magnets.

11. An interior permanent magnet rotor comprising:
   a rotor being disposed for rotation within, and relative to the ring-shaped stator, the rotor comprises:
   a shaft rotatably supported by the housing;
   a magnetic plate pair disposed about an outer circumference of the rotor, each magnetic plate of the magnetic plate pair having opposing sides that extend from the outer circumference toward the shaft, the opposing sides are bounded by an inner end of each magnetic plate;
   a triangular member disposed between the magnetic plate pair and the shaft, the triangular member having a flat surface mated to each inner end of each magnetic plate of the magnetic plate pair, the triangular member directs flux produced by rotation of the rotor toward the stator.

12. The interior permanent magnet rotor of claim 11, wherein the triangular member comprises adjacent sides that extend toward the shaft.

13. The interior permanent magnet rotor of claim 11, wherein at least one side of the opposing sides is convex in shape.

14. The interior permanent magnet rotor of claim 11, wherein the triangular member is substantially non-magnetic.

15. The interior permanent magnet rotor of claim 13, wherein the triangular member is made of plastic.

16. The interior permanent magnet rotor of claim 11, wherein a plurality of magnetic plate pairs and a plurality of triangular members are circumferentially spaced within the rotor about an axis formed by the shaft.

17. The interior permanent magnet rotor of claim 11, wherein a second side and a third side of the triangular member form an apex of the triangular member.

18. The interior permanent magnet rotor of claim 11, wherein the rotor, the ring-shaped stator and the shaft are cylindrically-shaped.

19. The interior permanent magnet rotor of claim 11, wherein a plurality of magnetic plate pairs and a plurality of triangular members extend along the cylindrically-shaped rotor.

20. The interior permanent magnet motor of claim 11, wherein the plurality of magnetic plate pairs are injection-molded magnets.

* * * * *